(12) United States Patent
Caretta

(10) Patent No.: US 6,945,295 B2
(45) Date of Patent: *Sep. 20, 2005

(54) TIRE FOR A VEHICLE WHEEL COMPRISING A PARTICULAR CARCASS STRUCTURE

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 254 days.

This patent is subject to a terminal disclaimer.

(21) Appl. No.: 09/937,601

(22) PCT Filed: Jan. 22, 2001

(86) PCT No.: PCT/EP01/00644

§ 371 (c)(1),
(2), (4) Date: Sep. 28, 2001

(87) PCT Pub. No.: WO01/54927

PCT Pub. Date: Aug. 2, 2001

(65) Prior Publication Data

US 2002/0153081 A1 Oct. 24, 2002

Related U.S. Application Data

(60) Provisional application No. 60/190,526, filed on Mar. 20, 2000.

(30) Foreign Application Priority Data

Jan. 28, 2000 (EP) .............................................. 00830058

(51) Int. Cl.$^7$ .......................... B60C 15/00; B60C 15/06; B60C 9/02; B60C 9/04; B60C 9/08
(52) U.S. Cl. ...................... 152/546; 152/539; 152/541; 152/548; 152/550; 152/558; 152/560
(58) Field of Search ................................ 152/550, 548, 152/558, 560, 546, 541, 539; 156/117

(56) References Cited

U.S. PATENT DOCUMENTS

| | | |
|---|---|---|
| 4,248,287 A | 2/1981 | Christman |
| 5,362,343 A | 11/1994 | Debroche |

(Continued)

FOREIGN PATENT DOCUMENTS

| | | |
|---|---|---|
| EP | 0919 406 A1 | 6/1999 |
| EP | 0 928 680 A1 | 7/1999 |
| FR | 384231 | 4/1908 |
| WO | WO 98/54006 | 12/1998 |
| WO | WO 00/26014 | 5/2000 |

OTHER PUBLICATIONS

Patent family data for US–6,457,504–B1.*
U.S. Appl. No. 09/364,099, filed Jul. 30, 1999, Caretta.

*Primary Examiner*—Adrienne C. Johnstone
(74) *Attorney, Agent, or Firm*—Finnegan, Henderson, Farabow, Garrett & Dunner, L.L.P.

(57) ABSTRACT

A carcass structure for vehicle wheel tires includes at least one carcass ply and a pair of annular reinforcing structures. The at least one carcass ply includes a first and a second series of strip segments consecutively arranged along a circumferential development of a toroidal support and including at least two filiform elements, positioned longitudinally and parallel to each other, at least partially coated by at least one layer of raw elastomer material. The annular reinforcing structures include at least one primary portion and at least one additional portion. The at least one primary portion includes a first circumferential-inextensible annular insert, a filling body, and at least one second circumferentially-inextensible annular insert. The at least one additional portion comprises at least one third circumferentially-inextensible annular insert. The annular inserts are each formed by at least one elongated element extending in concentric turns.

8 Claims, 4 Drawing Sheets

U.S. PATENT DOCUMENTS

| | | |
|---|---|---|
| 5,453,140 A | 9/1995 | Laurent et al. |
| 5,660,656 A | 8/1997 | Herbelleauu et al. |
| 5,702,548 A | 12/1997 | Arnaud et al. |
| 6,318,432 B1 | 11/2001 | Caretta et al. |
| 6,328,084 B1 * | 12/2001 | Caretta et al. .......... 152/550 X |
| 6,457,504 B1 * | 10/2002 | Caretta ................... 156/117 X |
| 2001/0023737 A1 | 9/2001 | Caretta et al. |
| 2001/0042587 A1 | 11/2001 | Caretta et al. |
| 2002/0011297 A1 | 1/2002 | Caretta et al. |
| 2002/0029841 A1 | 3/2002 | Caretta et al. |
| 2002/0056498 A1 | 5/2002 | Caretta et al. |
| 2002/0189737 A1 | 12/2002 | Caretta |

* cited by examiner

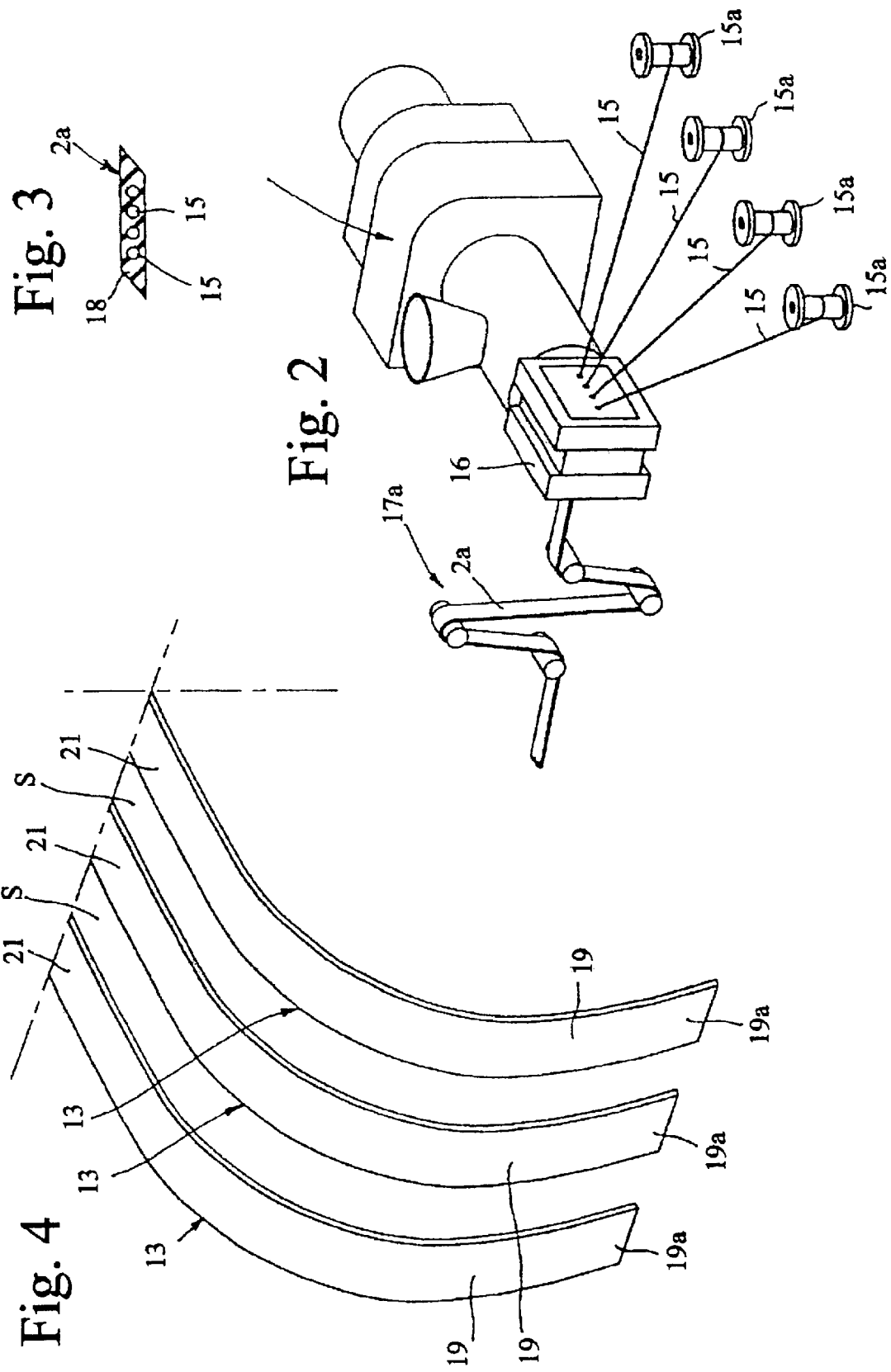

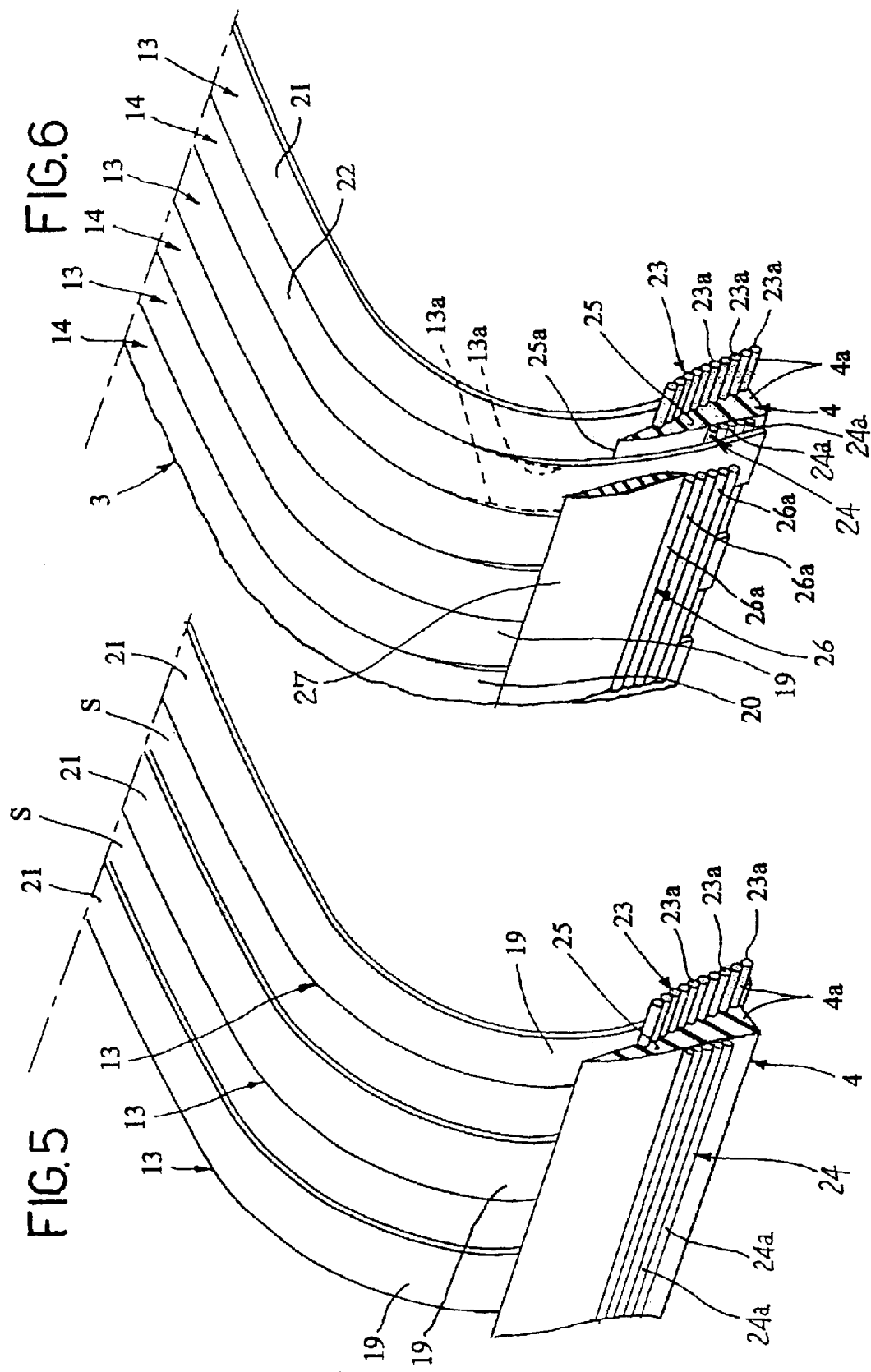

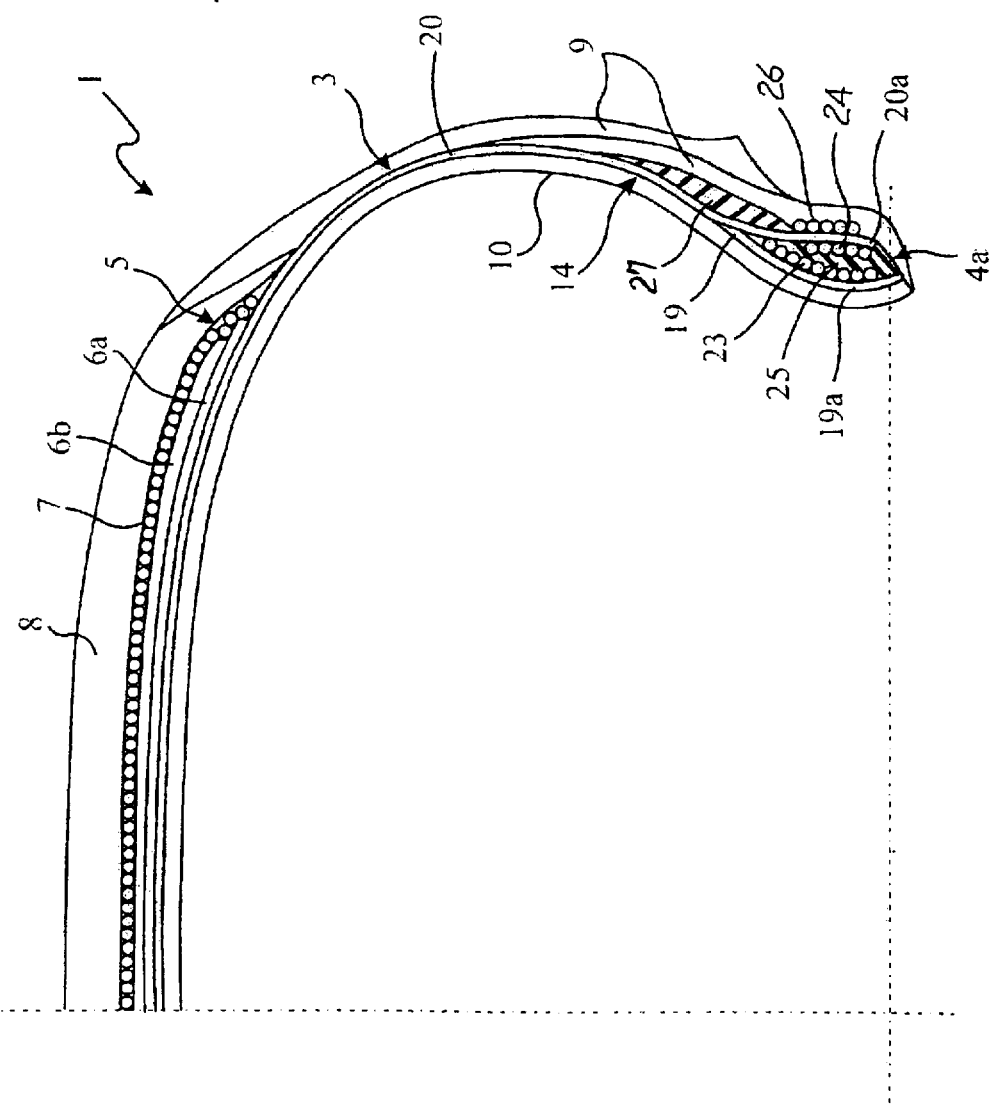

TIRE FOR A VEHICLE WHEEL COMPRISING A PARTICULAR CARCASS STRUCTURE

CROSS-REFERENCES TO RELATED APPLICATIONS

This application is a national stage entry under 35 U.S.C. § 371 from International Application No. PCT/EP01/00644, filed Jan. 22, 2001, in the European Patent Office; further, Applicants claim the benefit under 35 U.S.C. § 119(e) based on prior-filed, copending provisional application No. 60/190,526, filed Mar. 20, 2000, in the U.S. Patent and Trademark Office.

BACKGROUND OF THE INVENTION

1. Field of the Invention

The present invention relates to a carcass structure for tyres for vehicle wheels, comprising at least a carcass ply having a first and a second series of strip-like segments consecutively arranged along the circumferential development of the carcass structure, each of said which extends according to a substantially "U" shaped conformation and comprises at least two filiform elements positioned longitudinally and parallel to each other and at least partially coated by at least a layer of raw elastomeric material, and a pair of annular reinforcing structures each engaged in proximity to a respective interior circumferential edge of the carcass ply.

2. Description of the Related Art

The manufacture of tyres for vehicle wheels entails the formation of a carcass structure essentially composed by one or more carcass plies shaped according to a substantially toroidal configuration and presenting their axially opposite lateral edges engaged to respective circumferentially inextensible annular reinforcing elements, usually called "bead rings".

On the carcass structure is applied, in circumferentially exterior position, a belt structure comprising one or more belt strips shaped as a closed loop, essentially composed by textile or metallic cords suitably oriented relative to each other and to the cords belonging to the adjacent carcass plies.

In a position circumferentially exterior to the belt structure, a tread band is then applied, normally constituted by a strip of elastomeric material of suitable thickness.

It should be specified that, for the purposes of the present description, the term "elastomeric material" means the rubber compound in its entirety, i.e. the set formed by at least a polymeric base suitably amalgamated with reinforcing fillers and/or process additives of various kinds.

Lastly, on the opposite sides of the tyre being manufactured, a pair of sidewalls is applied, each of which covers a lateral portion of the tyre lying between a so called shoulder area, located in proximity to the corresponding lateral edge of the tread band, and a so-called bead located in correspondence with the corresponding bead ring.

Traditional manufacturing methods essentially provide for the tyre components listed above to be first produced separately from each other, then assembled in a tyre manufacturing phase.

For instance, the manufacture of the carcass ply or plies to be associated to the bead rings to form the carcass structure requires first that, through an extrusion and/or calendering process, a rubberised fabric be produced comprising continuous textile or metallic cords, arranged longitudinally. This rubberised fabric is subjected to a transverse cutting operation to produce segments of predetermined dimensions, which are subsequently united to originate a continuous belt-like semi-finished product, having transversely positioned parallel cords.

This manufactured item must then be cut into segments of a length correlated to the circumferential development of the carcass to be produced.

Manufacturing methods have also been proposed which, instead of producing semi-finished products, produce the carcass structure directly during the tyre manufacturing phase.

For instance, U.S. Pat. No. 5,453,140 describes a method and an apparatus that form a carcass ply starting from a single cord previously wound on a reel.

According to the method and the apparatus described in this patent, at each operative cycle of the apparatus the cord drawn from the reel by means of motorised driving rollers and kept tensioned by means of a pneumatic tensioning system is cut to measure to obtain a segment of predefined length.

The cord segment is drawn by a gripping element mounted on a belt wound on motorised pulleys to be laid transversely onto the exterior surface of a toroidal support.

The ends of the segment are then engaged by belt folding organs operating on opposite sides of the toroidal support to apply the cord segment radially onto the toroidal support itself by means of cursor elements which act in the manner of fingers along the lateral portions of the segment The repetition of the operative cycle described above leads to the laying of many cord segments in circumferential side by side relationship until the entire circumferential development of the toroidal support is involved.

Of necessity, the toroidal support is previously coated with a layer of raw rubber which has a dual function of adhering to the cords laid thereon in order adequately to hold them according to a fixed positioning, and of constituting an interior coating, impermeable to air, in the finished tyre.

Tyres obtained through this manufacturing method present a carcass structure wherein the carcass ply or plies are constituted by single cords each presenting two lateral portions axially distanced from each other and oriented radially to the axis of rotation of the tyre, and a crown portion extending in radially exterior position between the lateral portions.

Within the scope of the manufacture of the carcass structure, it is also known that in proximity to each of the beads of the tyre, the opposite ends of the single cords constituting a carcass ply are located, with alternating sequence, in axially opposite positions relative to an annular anchoring element constituting the aforesaid bead ring, shaped in the manner of an annulus composed by wire turns radially superposed on one another, as can be observed from the Patent EP 0 664 231 and from U.S. Pat. No. 5,702,548.

The cords that compose the carcass ply or plies, however, are positioned substantially according to the neutral axis of bending resistance of the respective bead. In this circumstance, the structural strength of the beads must necessarily be entrusted to the rigidity of filling inserts made of very hard elastomeric material incorporated in the structure of the bead, whose behaviour is affected by temperature variations due both to environmental factors, and to the stresses induced during normal operation.

In Patent FR 384 231, the production is proposed of a carcass structure by the laying, onto a toroidal support, of a series of rectangular bands made of rubberised fabric circumferentially positioned side by side one after the other and arranged according to radial planes relative to the geometric axis of the supporting drum itself. The laying of the bands is conducted in such a way that the terminal edges of two non-consecutive bands are partially covered by the terminal edges of the band interposed between them.

The spaces existing between the terminal edges covered by the bands are filled by means of trapezoidal inserts applied to the terminal edges of the band superposed thereon. The laying of the bands is effected according to several superposed layers, in a number correlated to the thickness to be conferred to the carcass structure. The presence of the aforesaid trapezoidal inserts determines a thickening of the carcass structure in the areas of the beads, providing it with double the thickness measurable in the rim.

U.S. Pat. No. 4,248,287 describes a method according to which the formation of the carcass structures provides for the laying, on a toroidal drum, of a plurality of layers each formed by radial strips composed by rubberised wires and set circumferentially side by side relative to each other. Once the laying is complete, two bead rings are applied in the bead area, around which bead rings are then folded back the terminal edges of the carcass layers formed by the radial strips.

SUMMARY OF THE INVENTION

In accordance with the present invention, it was found that within the scope of the manufacture of a tyre surprising advantages can be obtained if the carcass ply or plies are produced by laying at least two distinct series of strip-like segments and providing, in each of the annular structures reinforcing the beads, two annular inserts that grip the terminal edges belonging respectively to the segments of one of said series.

More specifically the invention relates to a carcass structure for tyres characterised in that each of said annular reinforcing structures comprises at least a primary portion presenting an axially interior side oriented towards terminal edges of the segments belonging to the first series and an axially exterior side oriented towards terminal edges of the segments belonging to the second series, and at least an additional portion positioned against the terminal edges of the strip-like segments belonging to the second series, to the opposite side relative to the primary portion of the annular structure itself; wherein said primary portion comprises a first circumferentially inextensible annular insert shaped substantially in the manner of an annulus positioned coaxially to the carcass structure and adjacently to an interior circumferential edge of the carcass ply, said first annular insert being formed by at least an elongated element extending according to concentric turns; a filling body made of elastomeric material presenting a side joined to the first annular anchoring insert; at least a second circumferentially inextensible annular insert substantially shaped in the manner of an annulus, formed by at least an elongated element extending according to concentric turns and positioned coaxially to the carcass structure in a position set axially side by side to the filling body and laterally opposite relative to the first annular insert; and wherein said additional portion comprises at least a third circumferentially inextensible annular insert shaped substantially in the manner of an annulus, formed by at least an elongated element extending according to concentric turns and positioned coaxially to the carcass structure and adjacently to an interior circumferential edge of the carcass ply.

Preferably, said first and second series of strip-like segments are positioned in a mutually alternated sequence along the entire circumferential development of the carcass structure.

It is also preferably provided for each of said strip-like segments to present two lateral portions developing substantially towards a geometric axis of said carcass structure in positions that are mutually distanced in the axial direction, and a crown portion extending in a radially exterior position between the lateral portions; the crown portions belonging respectively to the segments of the first and second series being set mutually side by side along the circumferential development of the carcass structure.

Preferably, the third and second annular inserts present each a lesser radial extension than the radial extension of the first annular insert. More specifically, the third circumferentially inextensible annular insert presents a lesser radial extension, measuring between ⅓ and ⅔ of the radial extension of the first circumferentially inextensible annular insert.

It may also be provided for the second circumferentially inextensible annular insert to present a lesser radial extension measuring between ⅓ and ⅔ of the radial extension of the first circumferentially inextensible annular insert Preferably, said carcass structure further comprises an auxiliary filling body made of elastomeric material, situated in an axially exterior position against said at least one carcass ply and extending in radial separation from said third annular insert.

Said auxiliary filling body preferably presents a hardness substantially equal to that of the filling body belonging to the primary portion.

The invention further relates to a tyre comprising a carcass structure presenting one or more of the particular features described.

BRIEF DESCRIPTION OF THE DRAWINGS

Further features and advantages shall become more readily apparent from the detailed description of a preferred, but not exclusive, embodiment of a carcass structure for tyres for vehicle wheels, according to the present invention The description shall be made below with reference to the accompanying drawings, provided purely by way of non limiting indication, in which:

FIG. 2 is a diagram showing the manufacture of a continuous strip-like element destined to form the carcass ply or plies;

FIG. 3 shows, in cross section view, an embodiment of the aforesaid strip-like element;

FIG. 4 shows an interrupted perspective view of a schematic representation of the laying sequence of a first series of strip-like segments in order to form a carcass ply of the tyre according to the invention;

FIG. 5 shows an interrupted perspective view of a primary portion of an inextensible annular reinforcing structure applied laterally on terminal edges of the strip-like segments belonging to the first series;

FIG. 6 shows an interrupted perspective view of the carcass structure after the application of a third annular insert and of an auxiliary filling body comprised in an additional portion of the bead reinforcing structure;

FIG. 7 is a cross section showing a tyre according to the invention.

DETAILED DESCRIPTION OF THE PREFERRED EMBODIMENTS

Figure 1:
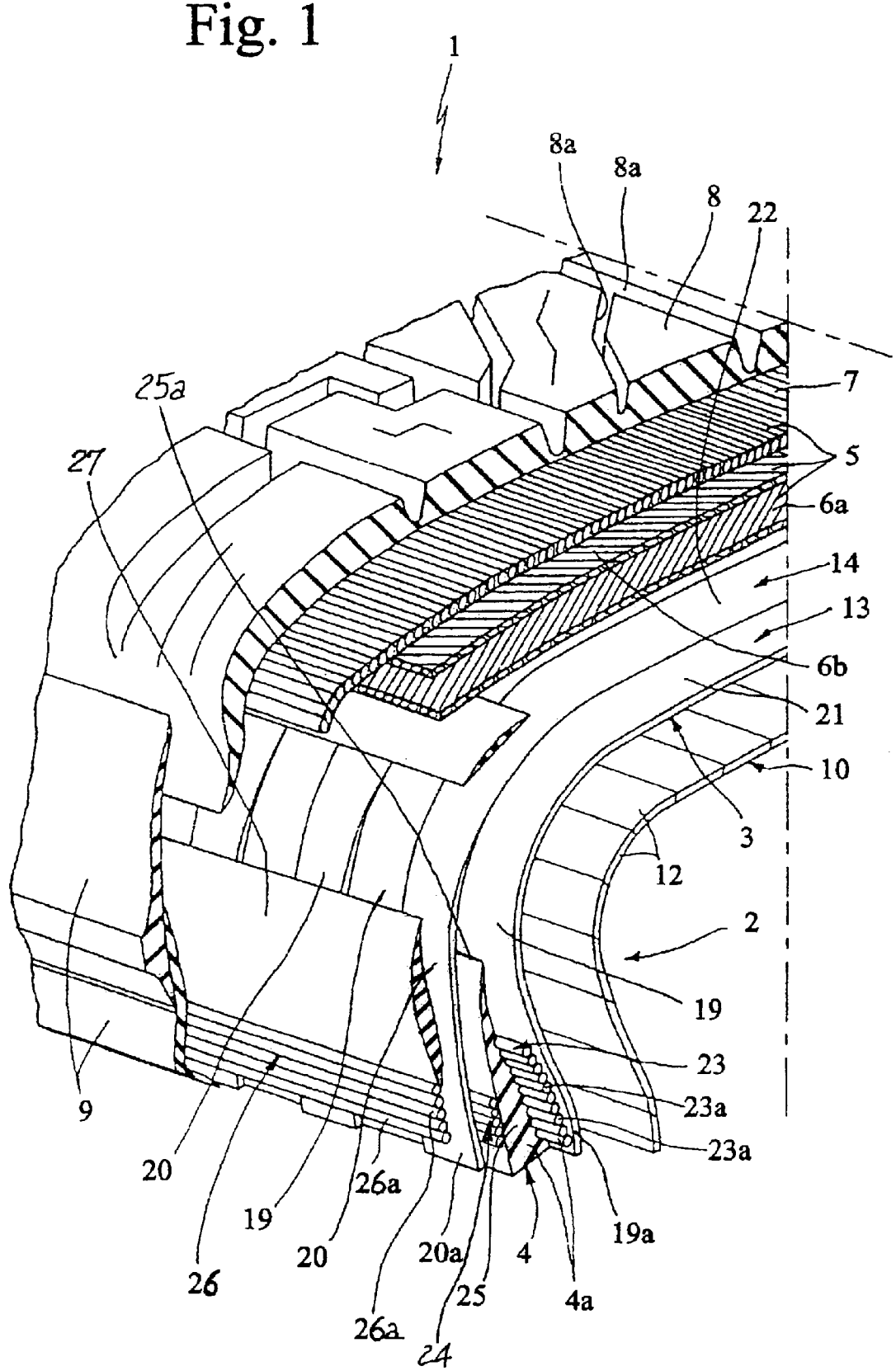
FIG. 1 is an interrupted and cut out view of a tyre provided with a carcass structure manufactured in accordance with the present invention.

With reference to the aforementioned figures, the number 1 globally indicates a tyre for wheels of vehicles, having a carcass structure 2 manufactured in accordance with the present invention.

The carcass structure 2 has at least a first carcass ply 3 shaped according to a substantially toroidal configuration and engaged, by means of its opposite circumferential edges, to a pair of inextensible annular structures 4 each of which, once the tyre has been completed, is located in the area usually identified with the name of "bead".

On the carcass structure 2 is applied, in circumferentially exterior position, a belt structure 5 comprising one or more belt strips 6a, 6b and 7. To the belt structure 5 is circumferentially superposed a tread band 8 whereon, following a moulding operation performed simultaneously with the curing of the tyre, longitudinal and/or transverse recesses 8a are obtained, arranged to define a desired "tread design".

The tyre further comprises a pair of so-called "sidewalls" 9 applied laterally at opposite sides onto the carcass structure 2.

The carcass structure 2 can be coated on its inner walls by a sealing layer 10 or so-called "liner", essentially constituted by a layer of elastomeric material impermeable to air able to guarantee the hermetic tightness of the inflated tyre.

The assembly of the components listed above, as well as the manufacture of one or more thereof, takes place with the aid of a toroidal support 11, schematically indicated in dashed lines in FIG. 1, shaped according to the configuration of the inner walls of the tyre to be manufactured.

The toroidal support 11 can have smaller dimensions than the finished tyre, according to a linear measurement preferably ranging between 2% and 5%, taken, by way of indication, along the circumferential development of the support itself in correspondence with its equatorial plane, which coincides with the equatorial plane of the tyre itself.

The toroidal support 11, neither described nor illustrated in detail because it is not particularly relevant for the purposes of the invention, can for instance be constituted by a collapsible drum or by an inflatable tube suitably reinforced to assume and maintain the desired toroidal shape in the inflated condition.

All this having been stated, the manufacture of the tyre 1 entails first the formation of the carcass structure 2, which starts with the possible formation of the sealing layer 10.

This sealing layer 10 can advantageously be obtained by circumferentially winding about the toroidal support 11 at least a ribbon-like band 12 made of elastomeric material impermeable to air, produced by a strainer and/or by a calender situated in the vicinity of the toroidal support itself. As can be observed from FIG. 1, the winding of the ribbon-like band 12 takes place substantially according to circumferential turns consecutively set by side to follow the cross section profile of the outer surface of the toroidal support 11.

For the purposes of the present invention the term cross section profile means the configuration presented by the semi-section of the toroidal support 11 sectioned according to a plane radial to its own geometric axis of rotation, not shown in the drawings, coinciding with the geometric axis of rotation of the tyre and, hence, of the carcass structure 2 being manufactured.

The carcass ply 3 is formed directly on the toroidal support 11 by laying, as shall become clearer farther on, a first and a second series of strip-like segments 13, 14, obtained from at least a continuous strip-like element 2a preferably presenting a width ranging between 3 mm and 15 mm.

As FIG. 2 shows, the preparation of the continuous strip-like element 2a essentially provides for one or more filiform elements 15, and preferably three to ten filiform elements 15, fed by respective reels 15a, to be guided through a first strainer 16 associated to an extrusion apparatus 17 which feeds raw elastomeric material through the strainer itself.

It is specified that, for the purposes of the present description, the term "strainer" means the part of the extrusion apparatus identified in the art also with the term "extrusion head", provided with a so-called "die" traversed by the product being processed in correspondence with an exit port shaped and dimensioned according to the geometric and dimensional characteristics to be given to the product itself.

The elastomeric material and the filiform elements 15 are intimately united inside the strainer 16, generating at the output thereof the continuous strip-like element 2a, formed by at least a layer of elastomeric material 18 in whose thickness are incorporated the filiform elements themselves.

Depending on requirements, it is possible to guide the filiform elements 15 into the strainer 16 in such a way that they are not integrally incorporated into the layer of elastomeric material 19 but emerge from one or both its surfaces.

The filiform elements 15 can, for instance, be constituted each by a textile cord with a diameter preferably ranging between 0.6 mm and 1.2 mm, or by a metal cord, with a diameter preferably ranging between 0.3 mm and 2.1 mm.

Advantageously, if required, the filiform elements 15 can be positioned in the continuous strip-like element 2a in such a way as to provide unexpected characteristics of compactness and homogeneity to the carcass ply 3 thereby obtained.

For this purpose, the filiform elements 15 can, for instance, be arranged according to a density exceeding six filiform elements per centimetre, measured circumferentially on the carcass ply 3 in proximity to the equatorial plane of the tyre 1. It is in any case preferably provided for the filiform elements 15 to be positioned in the strip-like element 2a according to a distance between their respective centres no smaller than 1.5 times the diameter of the filiform elements themselves, in order to allow for adequate rubberising between adjacent wires.

The continuous strip-like element 2a exiting the strainer 16 can advantageously be guided, possibly through an accumulating-compensating device 17a, onto a laying apparatus whose structural and operating characteristics are described more in detail in document EP 928680 A, in the name of the same Applicant, whose content is considered enclosed herein.

This laying apparatus is able sequentially to cut the continuous strip-like element 2a to obtain strip-like segments 13, 14 of predetermined length.

The execution of the cutting of each strip-like segment 13, 14 is immediately followed by the laying of the segment onto the toroidal support 11, shaping the strip-like segment according to a "U" configuration around the cross section profile of the toroidal support itself, in such a way that in the strip-like segment 13, 14 can be identified two lateral portions 19, 20 radially developing towards the axis of the toroidal support 11, in positions that are axially distanced from each other, and a crown portion 21, 22 extending in radially exterior position between the lateral portions themselves.

The stickiness of the raw elastomeric material forming the layer 18 which coats the filiform elements 15 assures the stable adhesion of the strip-like segments 13, 14 on the surfaces of the toroidal support 11, also in the absence of the sealing layer 10 on the toroidal support itself. More in particular, the adhesion described above is manifested as soon as the strip-like segment 13, 14 comes in contact with the toroidal support 11 in a radially exterior area of its cross section profile.

In addition or instead of the exploitation of the natural stickiness of the elastomeric material, as described above, the holding of one or more of the strip-like segments 13, 14 on the toroidal support 11 can be obtained by means of an aspirating action produced through one or more suitable holes provided on the toroidal support itself.

The toroidal support 11 can be actuated in angular rotation according to a stepped motion in synchrony with the actuation of the aforesaid laying apparatus, in such a way that each cutting action on each strip-like segment 13, 14 is followed by its laying in a circumferentially distanced position relative to the previously laid segment 13, 14.

More specifically, the rotation of the toroidal support 11 takes place according to an angular pitch whereto corresponds a circumferential displacement equal to a multiple of, and more precisely to double, the width of each strip-like segment 13, 14.

It should be noted that, for the purposes of the present description, unless otherwise indicated, the term "circumferential" refers to a circumference lying in the equatorial plane and in proximity to the exterior surface of the toroidal support 11.

According to the present invention, the operative sequence described above is such that a first complete revolution of the toroidal support 11 about its own axis determines the laying of the first series of strip-like segments 13, circumferentially distributed according to a circumferential pitch equal to twice the width of each of them. Therefore, as FIG. 4 clearly shows, between one and the other of the segments belonging to the first series an empty space "S" is left which, at least in correspondence with the crown portions 21 of the segments themselves, equals the latter in width.

The manufacture of a carcass structure 2 then proceeds with the phase whereby the aforementioned inextensible annular structures 4, and more specifically primary parts 4a thereof are applied in proximity to each of the interior circumferential edges of the carcass ply 3 being manufactured, in order to obtain the carcass areas, known as "beads", especially destined to guarantee the anchoring of the tyre to a corresponding mounting rim.

The primary portion 4a of each of the aforesaid annular reinforcing structures 4 comprises a first circumferentially inextensible annular insert 23, shaped substantially in the manner of a circular crown concentric to the geometric axis of rotation of the toroidal support 11 and located in a circumferentially interior position against terminal edges 19a presented by the strip-like segments 13 belonging to the first series.

The first annular insert 23 is composed by at least a metallic elongated element wound according to multiple, substantially concentric, turns 23a. The turns 23 can be defined by a continuous spiral or by concentric rings formed by respective elongated elements.

The first annular insert 23 is combined with a second circumferentially inextensible annular insert 24 which extends substantially according to a respective annulus coaxially set side by side relative to the first annular insert 23 at an appropriate distance therefrom.

The second annular insert 24 is also preferably composed by at least a metallic elongated element wound according to multiple, substantially concentric, turns 24, which can be defined by a continuous spiral or by concentric loops formed by respective elongated elements.

The second annular insert 24 presents a radial extension, determined by the difference between the minimum inner radius and the maximum outer radius of the annular insert itself, that is preferably lesser than, and more specifically ranging between ⅓ and ⅔ of, the radial extension of the first annular insert 23.

Between the first and the second annular insert 23, 24 is interposed at least a filling body 25 made of elastomeric material, preferably thermoplastic, having hardness ranging between 48° and 55° Shore D, measured at a temperature of 23° C.

The manufacture of the first portions 4a can entail the formation of the first filling body 25 separately from the first annular insert 23, and the subsequent union of the first filling body itself with the first annular insert previously applied against the terminal edges 19a of the strip-like segments 13 laid onto the toroidal support 11.

More specifically, in accordance with a preferential embodiment, the first annular insert 23 is manufactured directly against the terminal edges 19a of the strip-like segments 13 by laying at least an elongated element according to concentric turns 23a arranged in mutual side-by-side relationship, according to circumferences with progressively increasing diameter about their geometric winding axis, corresponding to the axis of rotation of the finished tyre.

The winding of the filiform element can be effected with the possible aid of rollers or other convenient means acting in contrast with the surface of the toroidal support 11.

The stickiness of the elastomeric layer 18 that coats the strip-like segments 13 belonging to the first series, as well as of the possible sealing layer 10 previously laid on the drum itself, assure the stable positioning of the individual turns 23a being formed.

Subsequently, the filling body 25 can in turn be formed directly against the annular anchoring insert 23, for instance applying a continuous strip made of elastomeric material exiting a strainer positioned adjacently to the drum 11. The continuous strip can present the final section conformation of the filling body 25, already as it exits the respective strainer. Alternatively, the continuous strip will present a smaller cross section than that of the filling body, and the latter shall be obtained applying the strip itself according to multiple turns set side by side and/or superposed, to define the filling body 25 in its final configuration.

Subsequently, the second insert 24 may be manufactured directly on the previously formed filling body 25 by laying an elongated element according to concentric turns 24a, in a similar manner to the one described with reference to the first insert 23.

After the application of the primary portions 4a of the respective annular reinforcing structures 4, the formation of the first carcass ply 3 is completed by laying the second series of strip-like segments 14 obtained by cutting to measure the continuous strip-like element 2a and applied on the toroidal support 11 in a manner similar to the one described for the strip-like segments 13 belonging, to the first series.

Each segment 14 belonging to the second series is laid according to a "U" conformation around the cross section profile of the toroidal support 11, between two consecutive segments 13 belonging to the first series. More specifically each segment 14 belonging to the second series presents the respective crown portion 22 circumferentially interposed between the crown portions 21 of the segments 13 belonging to the first series, to fill the space "S" existing between them, and a pair of lateral portions 20 which bring the terminal edges 20*a* of the segment itself in superposition to the respective primary portions 4*a* of the annular reinforcement structures 4, in axially opposite positions relative to the terminal edges 19*a* of the segments 13 belonging to the first series.

In other words, the primary portion 4*a* of each annular reinforcing structure 4, having a section profile shaped substantially in the manner of a triangle with its vertex oriented away from the axis of the tyre, presents an axially interior side oriented towards the terminal edges of the strip-like segments 13 belonging to the first series, and an axially exterior side oriented towards the terminal edges 20*a* of the segments 14 belonging to the second series.

The lateral portions 20 of each segment 14 belonging to the second series can also partially cover the lateral portions 19 of two consecutive segments 13 belonging to the first series, each in a length lying between the radially exterior edge 25*a* of the respective primary portion 4*a* and the transition area between the lateral portion itself and the crown portion 21.

The superposition areas of the strip-like segments 13 belonging to the first series are indicated as 13*a* in FIG. 6.

Due to the mutual convergence between the contiguous lateral portions 19, 20, oriented radially to the geometric axis of the toroidal support 11, the superposition or covering of the lateral portions 19 of the segments 13 belonging to the first series, i.e. the circumferential amplitude of the superposition areas 13*a*, progressively diminishes starting from a maximum value in proximity to the radially exterior edge 25*a* of the primary portion 4*a* of each annular reinforcing structure 4, down to a value of zero in correspondence with the transition area between the lateral portions 19, 20 and the crown portions 21, 22.

If, in proximity to the beads, a more homogeneous distribution of the filiform elements 15 respectively composing the segments 13, 14 of the first and of the second series is to be obtained, a deflection step can be executed sequentially on the continuous strip-like element 2*a* in the areas of its longitudinal development corresponding to the extremities of the strip-like segments 13, 14 to be obtained following the cutting actions. In this way, on the development of each strip-like segment 13, 14, areas with increased width are defined, positioned in correspondence with the interior circumferential edges of the carcass ply 3 thus formed.

The deflection action causes a reduction in the thickness of the elastomeric layer 18 and an increase in the width of the strip-like element 2*a* with the consequent mutual separation of the filiform elements 15. In so doing, the terminal edges 19*a*, 20*a* of each segment 13, 14 can be widened until they present, in correspondence with the circumferentially interior extremities, a width that is twice that of the crown portions 21, 22, such as to coat completely the respective interior and exterior sides of the primary portions 4*a* of each annular reinforcing structure 4.

After laying the strip-like segments 14 belonging to the second series in the manner described above, the formation of the annular bead reinforcing structures 4 is completed.

For this purpose, for each of the reinforcing structures 4 a third circumferentially inextensible annular insert 26 is formed, which extends substantially according to a respective annulus set coaxially side by side relative to the second annular insert 24.

The third annular insert 26, too, is preferably composed by at least a metallic elongated element wound according to multiple, substantially concentric turns 26*a*, which can be defined by a continuous spiral or by concentric loops formed by respective elongated elements. Moreover, the third annular insert also preferably has a radial extension, determined by the difference between the minimum inner radius and the maximum outer radius of the annular insert itself, that is lesser than, and preferably ranges between ⅓ and ⅔ of the radial extension of the first annular insert 23.

The third insert 26 thus constitutes an additional portion of the reinforcing structure 4, which is applied against the terminal edges 20*a* of the strip-like segments 14 belonging to the second series, for instance by effecting the winding of the respective elongated element directly against the terminal edges themselves.

Following this operation, each of the terminal edges 20*a* of the segments 14 belonging to the second series is advantageously enclosed between the second annular insert 24 and the third annular insert 26.

Also provided is the addition of an auxiliary filling body 27 made of elastomeric material placed in an axially exterior position against the carcass ply 3 and extending radially away from said third annular insert 26.

Preferably, the hardness of the auxiliary filling body 27 is substantially equal to the hardness of the filling body 25.

In radial tyres, a belt structure 5 is usually applied to the carcass structure 2.

This belt structure 5 can be obtained in any manner convenient to the person versed in the art and, in the illustrated embodiment, essentially comprises a first and a second belt strip 6*a*, 6*b* presenting cords with respectively crossed orientation. To the belt strips is superposed an auxiliary belt strip 7 for instance obtained by winding at least a continuous cord according to turns set axially side by side on the first and second belt strip 6*a*, 6*b*.

On the belt structure 5 are then applied the tread band 8 and the sidewalls 9, also obtainable in any manner found convenient by the person versed in the art.

Embodiments of a belt structure, of sidewalls and of a tread band that can be advantageously adopted for the complete manufacture of the tyre 1 on the toroidal support 11 are described in the document EP 919406 A in the name of the same Applicant.

The tyre 1 thus manufactured can now be subjected, after its removal from the support 11, to a curing phase which can be conducted in any known and conventional manner.

The present invention achieves important advantages.

The subject carcass structure can be obtained directly on a toroidal support whereon, advantageously, the entire tyre can be formed, with considerable reduction in processing times compared to the method described in document U.S. Pat. No. 5,362,343.

The constructive and structural conception of the subject tyre, especially with reference to its carcass structure 2, allows to achieve considerable improvements in terms of structural resistance, especially in proximity to the sidewalls and beads, where greater structural strength is normally required, as well as behaviour, particularly in relation to the effects of the drift thrusts that manifest themselves during travel in curves, while benefiting from all the advantages typically connected to a single-ply carcass structure.

In particular, the constructive features of the inextensible annular structures 4 and the manner whereby they are integrated in the carcass ply are such as further to enhance the excellent structural resistance of the tyre 1 in the areas of the beads and sidewalls.

The presence of the circumferentially inextensible annular inserts 23, 24 and 26, are intimately joined to the carcass ply 3, provides an excellent "bond" with the filiform elements 15 belonging to the different series of strip-like segments. The carcass structure 2 is thereby further strengthened in the areas corresponding to the beads of the tyre 1 without requiring, for this purpose, the use of additional strip-like inserts, usually called "flippers", wound in a loop around the annular reinforcing structures 4, used instead in the prior art.

In particular the presence of the second and third annular inserts which go to enclose the terminal edges 20a of the second series of the strip-like segments 14 brings about a particular strength of the bead without requiring an excessive radial development of the annular inserts themselves relative to the first annular insert. The reduced radial development of the second and third insert 24, 26 thus allows to obtain a space for the possible insertion of the auxiliary filling body 27 which can be provided, for instance to confer a greater strength and self support capacity to the whole tyre.

The increase in structural strength in correspondence with the sidewalls has advantageously been obtained without entailing an excessive stiffening of the carcass structure in the crown, where the segments of the single ply 3 are set circumferentially side by side in the absence of mutual superposition. This aspect is particularly advantageous with reference to high-performance tyres with lowered profile where the structure resistance of the sidewalls is a very critical item, also due to the high torque values the tyre must be able to transmit.

What is claimed is:

1. A tire for a vehicle wheel, comprising:
   a carcass structure;
   a belt structure applied to the carcass structure at a circumferentially-outer position of the carcass structure;
   a tread band circumferentially superposed on the belt structure; and
   sidewalls laterally applied to opposite sides of the carcass structure;
   wherein the carcass structure comprises:
     at least one carcass ply; and
     a pair of annular reinforcing structures;
   wherein the at least one carcass ply comprises a first series and a second series of strip segments consecutively arranged along a circumferential development of the carcass structure,
   wherein each strip segment extends according to a substantially U-shaped conformation,
   wherein each strip segment comprises at least two filiform elements, positioned longitudinally and parallel to each other, at least partially coated by at least one layer of elastomer material,
   wherein the first series and the second series of strip segments are arranged in a mutually-alternated sequence along the circumferential development of the carcass structure,
   wherein each annular reinforcing structure is engaged in proximity to a respective inner circumferential edge of the at least one carcass ply,
   wherein each annular reinforcing structure comprises:
     at least one primary portion; and
     at least one additional portion;
   wherein the at least one primary portion comprises an axially-inner side oriented toward terminal edges of the first series of strip segments,
   wherein the at least one primary portion comprises an axially-outer side oriented toward terminal edges of the second series of strip segments,
   wherein the at least one primary portion comprises:
     a first circumferentially-inextensible annular insert;
     a filling body; and
     at least one second circumferentially-inextensible annular insert;
   wherein the first annular insert is substantially annulus-shaped,
   wherein the first annular insert is positioned coaxially to the carcass structure, adjacent to the respective inner circumferential edge of the at least one carcass ply,
   wherein the first annular insert is formed by at least one elongated element extending in concentric turns,
   wherein the filling body is made of elastomeric material,
   wherein the filling body is joined to the first annular insert,
   wherein the at least one second annular insert is substantially annulus-shaped,
   wherein the at least one second annular insert is positioned coaxially to the carcass structure, axially side-by-side to the filling body and laterally opposite relative to the first annular insert,
   wherein the at least one second annular insert is formed by at least one elongated element extending in concentric turns,
   wherein the at least one additional portion is positioned against the terminal edges of the second series of strip segments on a side opposite to the at least one primary portion,
   wherein the at least one additional portion comprises at least one third circumferentially-inextensible annular insert,
   wherein the at least one third annular insert is substantially annulus-shaped,
   wherein the at least one third annular insert is positioned coaxially to the carcass structure, adjacent to the respective inner circumferential edge of the at least one carcass ply, and
   wherein the at least one third annular insert is formed by at least one elongated element extending in concentric turns.

2. The tyre of claim 1, further comprising a sealing layer disposed on an inner wall of the carcass structure.

3. The tyre of claim 1, wherein each strip segment comprises two lateral portions and a crown portion,
   wherein the lateral portions extend substantially toward a geometric axis of the carcass structure in positions mutually-spaced-apart in an axial direction,
   wherein the crown portion extends in a radially-outer position between the lateral portions, and
   wherein the crown portions of the first series and the second series of strip segments are set mutually side-by-side along the circumferential development of the carcass structure.

4. The tyre of claim 1, wherein the at least one second annular insert and the at least one third annular insert comprise a lesser radial extension than a radial extension of the first annular insert.

5. The tyre of claim 1, wherein the at least one third annular insert comprises a radial extension greater than or equal to one-third and less than or equal to two-thirds of a radial extension of the first annular insert.

6. The tyre of claim 1, wherein the at least one second annular insert comprises a radial extension greater than or equal to one-third and less than or equal to two-thirds of a radial extension of the first annular insert.

7. The tyre of claim 1, further comprising an auxiliary filling body;

wherein the auxiliary filling body is made of elastomeric material, wherein the auxiliary filling body is disposed in an axially-outer position against the at least one carcass ply, and wherein the auxiliary filling body extends radially away from the at least one third annular insert.

8. The tyre of claim 7, wherein a hardness value of the auxiliary filling body is substantially equal to a hardness value of the filling body.

* * * * *